Patented Mar. 21, 1950

2,501,026

UNITED STATES PATENT OFFICE 2,501,026

EPOXIDES AND PROCESS OF PREPARING SAME

Hans J. Cahnmann, New York, N. Y., and Ralph Daniels, Boston, Mass., assignors to William R. Warner & Co., Inc., New York, N. Y., a corporation of Delaware No Drawing. Application January 23, 1948, Serial No. 4,076

3 Claims. (Cl. 260—348)

This invention relates to the preparation of compounds useful as intermediates in the manufacture of pharmaceutical products, specifically vitamin A.

In accordance with this invention, compounds are provided having the structural formula

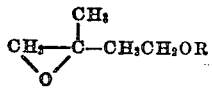

in which R denotes an alkyl or an aralkyl radical, e. g., methyl, ethyl, n-propyl, isopropyl and the like, or benzyl and substituted benzyl radicals.

The above compounds have been found to be highly reactive. Thus, they may be reacted with cyanides to form cyanohydrins, which are useful in the synthesis of organic compounds. They may also be reacted with enolates such as sodium ethyl-malonate, or with acetylides, to give substituted acetylenes, which may be condensed with beta ionone to give products convertible to vitamin A. It is evident, therefore, the compounds of my invention are of considerable value as intermediates for use in synthesis of valuable organic compounds.

The compounds of our invention may be prepared by reacting a 2-methyl-4-alkoxy-butene-1 or a 2-methyl-4-aralkoxy-butene-1 with an organic peracid such as perbenzoic acid, perphthalic acid or peracetic acid at temperatures of from —10° to 25° C., preferably under substantially anhydrous conditions. They may also be prepared by reaction of a compound having the structural formula

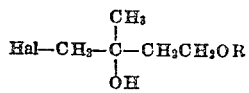

in which R denotes an alkyl or an aralkyl radical and Hal denotes a halogen, e. g. bromine or chlorine, with an alkali metal hydroxide such as potassium hydroxide, preferably in excess of the equimolar amount required, at temperatures of —10° to 25° C., preferably under substantially anhydrous conditions; in this reaction use of alkali metal hydroxides free of iron is preferred in order to obtain optimum yields. The compounds of this invention may be recovered from the reaction mixture by distillation or in any other suitable manner.

It should be understood that the radical R in the formulas above given may be any alkyl or aralkyl radical, the particular radical being relatively unimportant. The preferred compounds of this invention are those in which R is a short chain alkyl radical containing not over four carbon atoms, but R may also be a longer chain alkyl radical or an aralkyl radical such as benzyl, tolyl, xylyl and the like.

The following examples are illustrative of our invention:

*Example 1.*—100.2 grams of 2-methyl-4-methoxy-butene-1 was introduced into a vessel and cooled to 5° C. An equimolar amount of a dried solution of perbenzoic acid in chloroform (prepared as described in "Organic Synthesis," Coll. vol. 1, second edition, page 431) was then added to the cooled butene with agitation, the temperature being maintained below 10° C., and the mixture permitted to stand overnight in a refrigerator. At the end of this time the reaction mixture was poured into 220 ml. of cold 20% sodium hydroxide solution, the mass permitted to stratify, the organic layer separated, and washed with water; the water washings were extracted with ether, the ether extracts added to the organic layer, and the solution dried. The solution was heated to remove solvent, and then distilled under a vacuum of 125 mm., 108 grams of a product boiling between 85.4° and 86° C., at 125 mm. and having a refractive index ($n_D^{25}$) of 1.4102-1.4105 being obtained. Upon analysis the product gave 61.9% carbon, 10.4% hydrogen and 26.8% of the methoxy radical; theory for the desired expoxide is 62.0% carbon, 10.4% hydrogen and 26.7% of the methoxy radical. This product, therefore, was the substantially pure epoxide. Its specific gravity ($d_4^{25}$) was 0.9202.

*Example 2.*—400 ml. of anhydrous ether were placed in a vessel and cooled to —7° C. 98.6 grams of 1-bromo-2-hydroxy-2-methyl-4-methoxy - butane and 167.5 grams of powdered potassium hydroxide were then gradually added to the ether with agitation at a rate such that a substantial excess of potassium hydroxide was always present, the temperature being maintained below —2° C. At the end of this time the reaction mixture was permitted to come to room temperature, agitated for one hour and placed in a refrigerator overnight. The solid mass was then removed by filtration and washed with ether, the ether washings being combined with the main ether solution. After removal of the ether, the reaction mixture was distilled at 110 mm., 53.6 grams of a fraction boiling 80° to 83° C. being recovered; this fraction had a refractive index ($n_D^{25}$) of 1.4104–1.4115, and was the desired epoxide.

Since certain changes may be made in the above products, and in the processes for preparing same, without departing from the scope of the invention, it is intended that all matter contained in the above description shall be interpreted as illustrative and not in a limiting sense.

We claim:

1. A compound having the structural formula

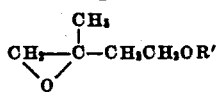

in which R' denotes a radical selected from the group consisting of alkyl and aralkyl radicals.

2. A compound having the structural formula

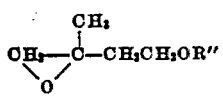

in which R" denotes an alkyl radical containing not over four carbon atoms.

3. A compound having the structural formula

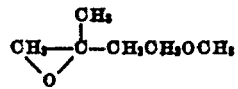

HANS J. CAHNMANN.
RALPH DANIELS.

REFERENCES CITED

The following references are of record in the file of this patent:

UNITED STATES PATENTS

| Number | Name | Date |
|---|---|---|
| 1,986,082 | Thole et al. | Jan. 1, 1935 |
| 2,181,100 | Slagh et al. | Nov. 21, 1939 |
| 2,314,039 | Evans et al. | Mar. 16, 1943 |
| 2,411,762 | Swern | Nov. 26, 1946 |

FOREIGN PATENTS

| Number | Country | Date |
|---|---|---|
| 556,038 | Great Britain | Sept. 17, 1943 |